(12) United States Patent
Bergonzi et al.

(10) Patent No.: US 10,552,649 B2
(45) Date of Patent: Feb. 4, 2020

(54) SEALING SYSTEM AND METHOD OF INSTALLING A SEALING SYSTEM

(71) Applicant: THE EUROPEAN ATOMIC ENERGY COMMUNITY (EURATOM), REPRESENTED BY THE EUROPEAN COMMISSION, Brussels (BE)

(72) Inventors: Claudio Bergonzi, Ispra (IT); Marco Parnisari, Gemonio (IT); François Littmann, Cocquio Trevisago (IT)

(73) Assignee: The European Atomic Energy Community (Euratom) Represented by the European Commission, Brussels (BE)

(*) Notice: Subject to any disclaimer, the term of this patent is extended or adjusted under 35 U.S.C. 154(b) by 0 days.

(21) Appl. No.: 16/095,682

(22) PCT Filed: Apr. 13, 2017

(86) PCT No.: PCT/EP2017/059021
§ 371 (c)(1),
(2) Date: Oct. 22, 2018

(87) PCT Pub. No.: WO2017/182398
PCT Pub. Date: Oct. 26, 2017

(65) Prior Publication Data
US 2019/0347452 A1 Nov. 14, 2019

(30) Foreign Application Priority Data

Apr. 22, 2016 (EP) .................................... 16166702

(51) Int. Cl.
*G06K 7/10* (2006.01)
*G06K 19/07* (2006.01)
(Continued)

(52) U.S. Cl.
CPC ...... *G06K 7/10306* (2013.01); *G06K 19/0717* (2013.01); *G06K 19/07372* (2013.01); *G06K 19/07737* (2013.01); *G06K 19/07798* (2013.01)

(58) Field of Classification Search
CPC .......... G06K 7/10306; G06K 19/0717; G06K 19/07372; G06K 19/07737; G06K 19/07798
(Continued)

(56) References Cited

U.S. PATENT DOCUMENTS

2004/0239435 A1* 12/2004 Hughes ..................... B63C 9/22
333/1.1
2006/0285440 A1* 12/2006 Dagher .................. B65D 90/00
367/149
(Continued)

FOREIGN PATENT DOCUMENTS

WO  WO 2005/111961 A1  11/2005
WO  WO 2014/009981 A1  1/2014

OTHER PUBLICATIONS

International Search Report and Written Opinion for corresponding International Application No. PCT/EP2017/05901, dated Jun. 23, 2017 (10 sheets).
(Continued)

*Primary Examiner* — Kerri L McNally
(74) *Attorney, Agent, or Firm* — Lewis Roca Rothgerber Christie LLP

(57) ABSTRACT

A sealing system for sealing a container lid to a container body includes at least three tags adapted to be mounted to the container lid or the container body, each tag having a unique ID and a first RF transceiver configured to transmit a first RF signal. The system includes at least three anchors adapted to be mounted to the other of the container lid and the container body, each anchor having a unique ID and a
(Continued)

second RF transceiver configured to receive the first RF signals. A master unit is adapted to (i) determine, associated with the ID for each tag, a respective current 3D position, based on the first RF signals, (ii) store previously determined 3D positions for each tag, and (iii) generate an alert, time-stamp and/or a log entry if separation between the current 3D position and a respective previously determined 3D position exceeds a threshold.

15 Claims, 3 Drawing Sheets

(51) Int. Cl.
*G06K 19/077* (2006.01)
*G06K 19/073* (2006.01)

(58) Field of Classification Search
USPC .................................................. 340/568.1
See application file for complete search history.

(56) References Cited

U.S. PATENT DOCUMENTS

2007/0069895 A1* 3/2007 Koh ..................... G06K 19/02
340/572.1
2009/0058655 A1* 3/2009 Norair ................ G06K 19/0716
340/572.1

OTHER PUBLICATIONS

Second Written Opinion for corresponding International Application No. PCT/EP2017/05901, dated May 2, 2018 (5 sheets).
International Preliminary Report on Patentability for corresponding International Application No. PCT/EP2017/05901, dated Sep. 13, 2018 (16 sheets).

* cited by examiner

SEALING SYSTEM AND METHOD OF INSTALLING A SEALING SYSTEM

CROSS REFERENCE TO RELATED APPLICATIONS

This application is a National Phase patent application of and claims priority to and the benefit of International Patent Application Number PCT/EP2017/059021, filed on Apr. 13, 2017, which claims priority to EP Patent Application Number 16166702.7, filed on Apr. 22, 2016. The entire contents of both of which are incorporated herein by reference.

TECHNICAL FIELD

The present invention generally relates to sealing systems, in particular for tamper-detection sealing of nuclear containers. With such sealing, a container lid is fixed to a container body and may comprise means for identifying the individual container. The invention further relates to a method of installing a sealing system.

BACKGROUND ART

Under some circumstances, the secure sealing of containers is necessary. It is of particular importance if such containers hold dangerous substances, such as fissile materials.

For example, an inspection agency wishes to verify that a cask (container) containing nuclear spent fuel is transferred between two facilities without being opened. Transport casks are filled at a facility, transferred by truck, rail or boat to another facility and then re-opened.

The inspector traditionally has access to the casks and lids at three different stages—before they are filled, during transfer and after the cask is opened and emptied.

It is desirable that casks be filled under surveillance, closed by the operator and sealed by the operator, but no inspector from the agency is required to be present during the filling/closing/sealing operation. The seal applied by the operator must be conceived in a way to (i) avoid intentional/unintentional bad installation that will inhibit/alter the correct function of the seal, (ii) uniquely match cask and lid, (iii) detect an unauthorized opening during transport, (iv) avoid being cloned, and (v) store data and guarantee that the data has not been manipulated.

Techniques for secure sealing of containers are known, i.e. sealing whereby tampering/opening of the container thereafter is detectable/visible.

Known ways of sealing nuclear containers make use of perforated bolts or other fixtures in combination with wire seals (metal cable or fibre optic loops). All the known systems require the presence of a trusted person (i.e. an inspector) at the time of closing and opening.

For example, prior solutions involve the use of passive loop seals (like the COBRA seal) or active electronic seals (like EOSS). In each case, a wire or fibre optic is passed through a fixture in the cask and in the lid when the cask is closed. The wire is connected to a seal. In case of the COBRA seal, to open the cask the seal must be broken. In case of the EOSS seal, openings are recorded internally in the seal. A disadvantage is that both previous systems rely on the correct wire installation on the fixtures on the cask. Also, a loose wire may allow the opening of the cask without detection by the seal. Further, the fibre optic wire may be damaged during transport, rendering the seal useless. The COBRA system requires an inspection before the cask is opened (seal broken) because there is no way to determine the time at which the seal was broken.

Other seals detect displacement by means of contact or magnets, but the methods are not very strong against tampering attempts.

Even if the existing sealing bolts already seal the containers very securely, there is no known system that fulfils all the requirements, especially the possibility to work unattended without compromising the security of the system.

US-A-2004/239435 is generally directed to a tamper detection system for life raft containers. The life raft container is used for storing an inflatable life raft and includes a top part and a bottom part that are placed directly onto one another. The container further comprises an RFID system capable of detecting when the container has been opened, i.e. when a distance between the container parts has increased. Specifically, a mother RFID tag and daughter RFID tag are linked to one another and actively communicate with one another to determine a distance between them. When the distance between the mother RFID tag and the daughter RFID tag increases or decreases with respect to a distance D beyond a predetermined amount.

WO-A-2005/111961 is generally directed to the use of RFID tags for tamper-evidence. Specifically, a pair of RFID tags is used to detect a change in the relative position of a closure lid with respect to a container.

WO-A-2014/009981 is generally directed to the synchronization of a real-time Ultra-Wide Band locating system. Specifically, triangulation in three dimensions using at least four readers is used to determine the 3D position of a tagged item.

Technical Problem

It is an object of the present invention to provide a sealing system with improved security features and operable whereby a sealing system may be installed by the operator of a storage site without the presence of inspectors, such as defined in certain exemplary claims. It is a further object of the present invention to provide a method of installing a sealing bolt, such as defined in certain exemplary claims.

General Description of the Invention

According to one aspect of the invention there is provided a sealing system for sealing a container lid to a container body, said sealing system comprising: at least three tags adapted to be mounted to one of said container lid or said container body, each tag having a unique ID and comprising a first RF transceiver configured to transmit, in use, a respective first RF signal; at least three anchors adapted to be mounted to the other one of said container lid or said container body, each anchor having a unique ID and comprising a second RF transceiver configured to receive, in use, the first RF signals; and a master unit, coupled for communication with the at least three anchors; wherein the master unit is adapted to (i) determine, associated with the ID for each tag, a respective current 3D position, based on the received first RF signals, (ii) store previously determined 3D positions for each tag, and (iii) generate an alert and/or a timestamp and/or a log entry if it determines that separation between the current 3D position of one or more of the tags and a respective previously determined 3D position is greater than a predetermined distance threshold.

The master unit may have one of the at least three anchors integrated therein.

Advantageously, once the sealing system is placed on the casks and lid by an inspector, the system is transparent to the operator that will fill and close the casks. The operator does not have to perform any operation to install or activate the sealing system, so no mistake (intentional or unintentional) can be made.

In practical terms, this sealing system is more secure: it requires less work by the operator, who will not have any extra activity, and requires fewer inspections from the inspectors of the agency, who can also inspect the sealing system at the most convenient time.

Each of the anchors may be configured for transmitting, periodically or on command from the master unit, a second RF signal, the second RF signal comprising a timing signal.

Each first RF signal may comprise a signal generated at a respective tag in response to the second RF signal and/or including an indication of the time of arrival at the tag of the second RF signal.

The master unit may be configured for performing temporal averaging of the first RF signal and/or data indicative of the 3D position.

The master unit may be configured for determining a time point at which the separation between the anchors and the tags has minimized, or stabilized.

The anchors may be fixedly attached on the container at known locations, for example equally spaced on the circumferential periphery of the container, and the master unit is configured to determine, for each tag, a respective current 3D position based on the known locations.

The master unit may be configured to determine, for each tag, a respective current 3D position using a triangulation algorithm.

In embodiments, each tag and/or each anchor includes a real-time clock, and the first RF signal and/or the second RF signal incorporates a timestamp derived from a respective real-time clock.

In embodiments, each of said anchors is configured to transmit a combined signal to the master unit, the combined signal comprising a package for each of said at least three tags, each package including the tag ID and time of arrival data. Such transmission may e.g. be performed via a bus.

In embodiments, each tag and/or each anchor and/or the master unit comprises a non-volatile memory (NVM) for storing said 3D positions, in association with respective tag IDs.

In embodiments, each tag includes a first cryptographic module configured for generating and storing a first cryptographic key and/or first digital signature, and each tag is configured for signing said first RF signal using said first cryptographic key or first digital signature prior to transmission to an anchor.

In embodiments, each anchor tag includes an optional second cryptographic module configured for generating and storing a second cryptographic key and/or second digital signature, and each anchor is configured for (i) signing said second RF signal using said second cryptographic key or second digital signature prior to transmission to a tag; and/or (ii) signing said combined signal using said second cryptographic key or second digital signature prior to transmission to the master unit. The second cryptographic key and/or second digital signature may be generated by the first cryptographic module.

The digitally signed data can be stored locally or sent remotely by the master, without any risk of data alteration. An intermediate verification of the seal is not required, since all the events related to the lid closure or opening are stored and can be retrieved from a signed log in the NVM.

In embodiments, each tag and/or each anchor includes a tamper detection sensor configured for generating, in the event of detection thereby of tampering with a housing of a tag or an anchor, tamper detection data indicative of said tampering with the housing.

In embodiments, each tag and/or each anchor includes one or more batteries, coupled thereto, a voltage detection sensor configured for generating, in the event of detection thereby of exceptional voltage levels outside a first predetermined range, voltage exception data indicative of tampering with the battery or batteries.

In embodiments, each tag and/or each anchor includes a temperature sensor configured for generating, in the event of detection thereby of exceptional temperature levels outside a second predetermined range, temperature exception data indicative of tampering with a tag or an anchor.

In embodiments, each tag or anchor is attached to the container lid or container body, by a rigid tension belt, for example made of steel, plastic or composite, each tag and/or each anchor includes a strain sensor, for example a strain gauge, adapted for sensing strain in the belt, the strain sensor being configured for generating, in the event of detection thereby of exceptional strain levels outside a third predetermined range, strain exception data indicative of tampering with a tag or an anchor.

The master unit may include a long-range communications module, for example a cellular communications module, and may be configured, in response to the generation of the alert, to (a) generate a cask opened alert, optionally append thereto any data indicative of tampering with the housing, data indicative of tampering with the battery or batteries, temperature exception data and/or strain exception data, and (b) transmit the cask opened alert to a remote control location using the long-range communications module.

The master unit may be configured, in response to a status request received from a remote control location using the long-range communications module, for transmitting a sealing system status report, the sealing system status report including the timestamp and details of any cask opened alert, and optionally any data indicative of tampering with the housing, data indicative of tampering with the battery or batteries, temperature exception data and/or strain exception data; wherein the sealing system status report is transmitted to the remote control location using the long-range communications module.

According to another aspect of the invention there is further provided a method of installing a sealing system, comprising: providing a sealing system according to any of the exemplary appended claims; mounting the tags and anchors to the container lid and the container body respectively; and initiating the sealing system.

Further advantages of the invention, at least in embodiments, include:
  a. Unattended operation. Once the sealing system is applied to the container by an inspector, that status of the container (open/closed) is monitored. All the loading, closing, opening and unloading operations are done by the operator and do not require the presence of an inspector.
  b. Simple system for sealing the container.
  c. High security and with real time information.
  d. Minimal exposure of inspectors to radiation.
  e. Better time organization afforded, as the inspector is not forced to be physically present at the closure of each individual container, but can concentrate its activities in a short time frame on a batch of containers.

BRIEF DESCRIPTION OF THE DRAWINGS

Further details and advantages of the present invention will be apparent from the following detailed description of several non-limiting embodiments with reference to the attached drawings, wherein.

DESCRIPTION OF PREFERRED EMBODIMENTS

The need for a sealing system able to be installed by the operator without the presence of an inspector is of utmost importance and urgency. At least in embodiments, the present invention seeks to provide a sealing system to be applied to nuclear dry storage casks that fulfils one or more of the following requirements:

a. It shall operate automatically, unattended.
b. It shall be used on the lid and body of nuclear containers, without any modification to the container body or lid and without interfering with normal loading/unloading procedures.
c. It shall uniquely identify container body and container lid together as a single item (avoiding cloning).
d. It shall be easily installed and removed.
e. It shall detect any opening/closing of the container by removing the lid.
f. It shall detect any attempt to remove the sealing device from the container lid or body.
g. It shall be able to log and digitally sign opening/closing and tampering events.
h. It shall be remotely interrogated for remote/real time control.
i. It shall be self-powered (no need of external power supply) for transport operations.
j. It can be installed by the operator alone and be verified later on, during an inspection, by an inspector who has to trust that the seal has not been tampered in the meantime, meaning that the content of the cask is the same as when it was initially sealed.
k. It can include an anti-tampering enclosure containing the seal and an electronic monitoring device enabling the package to be shipped by the inspectors to the operator, while trusting that it has not been modified before installation.
l. It can allow verification of the identity and integrity of the seal through inspection.
m. It can carry an identity which can be univocally coupled with the container; and
n. It is able to withstand harsh operating conditions.

In the description and drawings, like numerals are used to designate like elements. Unless indicated otherwise, any individual design feature, component or step may be used in combination with any other design features, components or steps disclosed herein.

Figure 1:
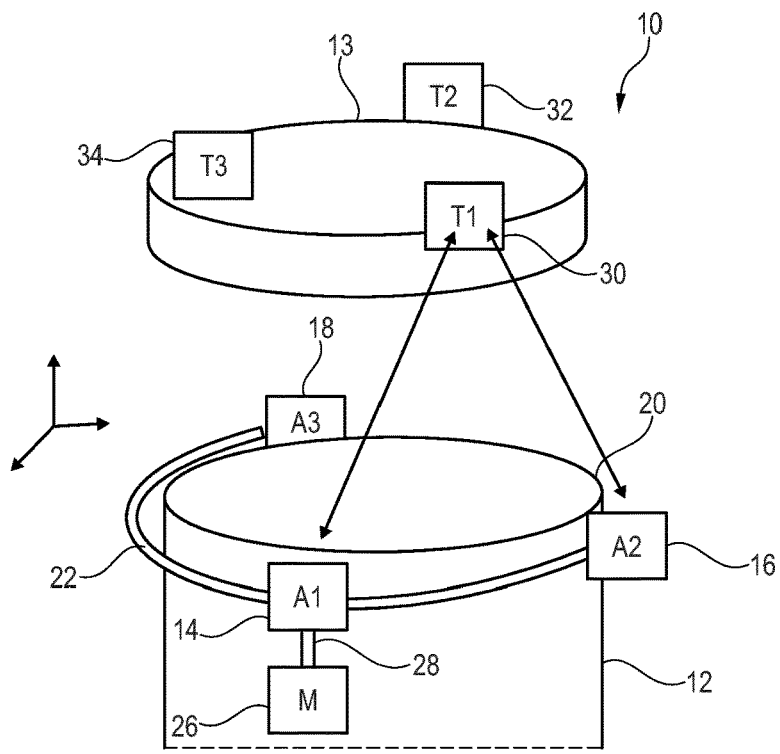
FIG. 1 is a disassembled view of a cask (container), having a sealing system according to a preferred embodiment of the invention mounted thereon.

FIG. 1 illustrates a disassembled view of a cask (container) 10, having a sealing system according to a preferred embodiment of the invention mounted thereon.

In this embodiment, the sealing system includes three electronic devices of a first type (A1 to A3; herein referred to as "anchors" 14, 16, 18) that are attached to the outer periphery of a container body 12 at its open end 20. The container body 12 is of the type, for example, to be filled with nuclear waste materials or other hazardous waste products. The three anchors 14, 16, 18 are linked and in communication via a wired connection, namely bus 22. In this embodiment, a master unit 26 is linked via a further wired connection 28 to one of the anchors, in this case anchor 14.

However, in another, preferred, embodiment (not shown), the functionalities and/or componentry of master unit 26 are incorporated into one of the anchors 14, 16, 18, for example anchor 14. This integration provides optimization and simplifies manufacture/setup.

The anchors 14, 16, 18 are mounted on the container body 12 at known locations, e.g. equally spaced apart around the circumferential periphery of container body 12. Thus, in the case of three anchors 14, 16, 18, these are angularly spaced at 120 degree intervals. It will be appreciated, however, that four or more anchors 14, 16, 18 may be used around the periphery of container body 12, so that in the case of four anchors, these are angularly spaced at 90 degree intervals, and so on.

In a preferred embodiment, the three anchors 14, 16, 18 are fixed to the container body 12 by a rigid tension belt (not shown), to prevent unauthorized removal.

The sealing system according to this embodiment of the invention also includes, mounted on lid 13 of the container 10, three electronic devices of a second type (T1, T2, T3; herein referred to as "tags" 30, 32, 34).

In a preferred embodiment, the three tags 30, 32, 34 are fixed to the container lid 13 by a rigid tension belt (not shown). In the case that three tags 30, 32, 34 are present, these are angularly spaced at c. 120 degree intervals. It will be appreciated, however, that four or more tags 30, 32, 34 may be used around the periphery of container lid 13, so that in the case of four anchors, these are angularly spaced at c. 90 degree intervals, and so on.

Generally, the use of more tags and anchors can increase the precision.

In use, the sealing system comprising the anchors 14, 16, 18 and the tags 30, 32, 34, as well as master unit 26, is fixed to the container 10 prior to filling the container body 12. The filling and sealing of the container does not require the presence of an inspector.

In accordance with embodiments of the invention, the anchors 14, 16, 18 and the tags 30, 32, 34 communicate with each other using Ultra Wide Band (UWB) radio frequency (RF) signals in order to determine device separation distances and/or positions in 3 dimensions (3D), as discussed in detail below. While, in this embodiment, UWB RF transceivers are used, it will be appreciated that non-UWB RF techniques may be employed.

Figure 2:
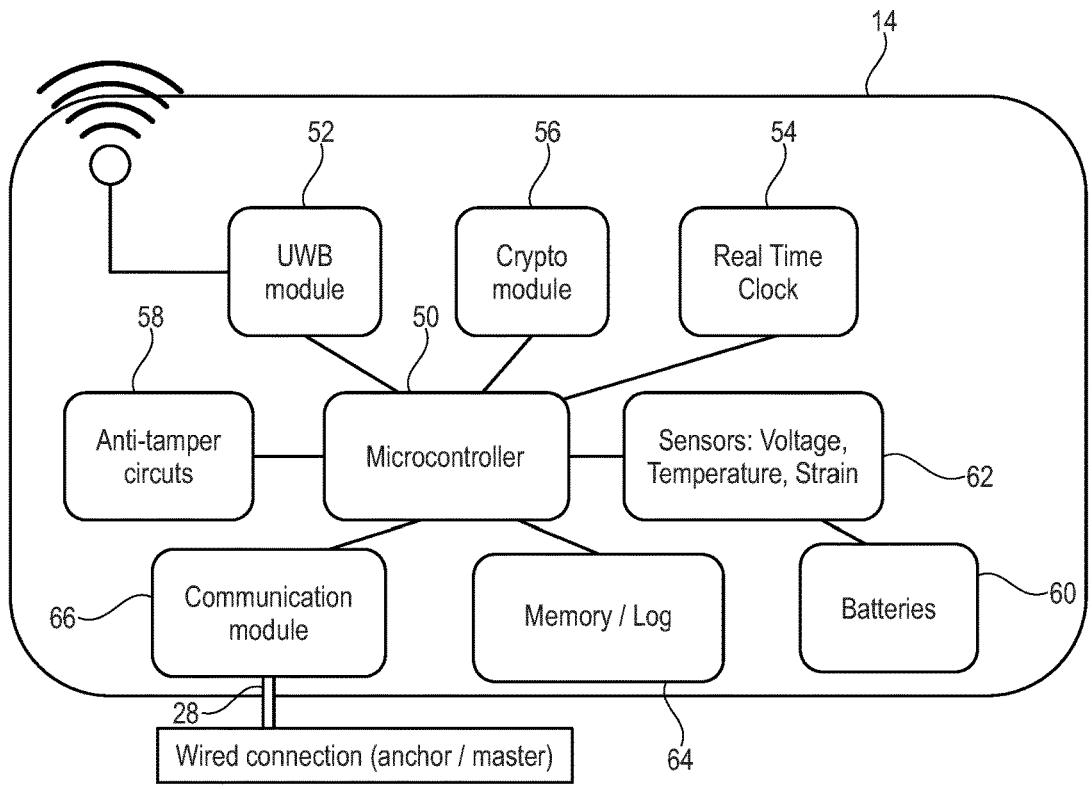
FIG. 2 is a schematic block diagram of a tag or anchor used in the sealing system of FIG. 1.

FIG. 2 shows a schematic block diagram anchor 14 used in the sealing system of FIG. 1. (The tags 30, 32, 34 are similar devices to anchors 14, 16, 18 and share the same architecture, but are programmed differently, e.g. in firmware. For the sake of brevity, only the architecture of anchor 14 is discussed here; the tags 30, 32, 34 and anchors 16, 18 are constructed similarly. As used herein, "device" may refer to each of tags 30, 32, 34, to each of anchors 14, 16, 18, or to any or all of these.)

The core of the device is a low power microcontroller 50, to manage all the information of the different subsystems of the device and to coordinate all the communications with other devices, including the master unit 26. The RF (e.g. UWB) ranging—to determine the relative 3D position of at least each of the tags 30, 32, 34—is accomplished through a dedicated UWB module 52 that transmits and receives data packages (including time of flight (ToF) data) and time-stamps, the latter being provided by real-time clock (RTC) 54. Real-time clock 54 is preferably a precise real time clock that keeps track of time for precise time-stamping of data (packages)/RF messages.

The anchor 14 also contains a cryptographic module 56 (crypto-chip) that can generate and store cryptographic keys to digitally sign the data (packages) before being transmitted. That is, each tag and anchor is equipped with a cryptographic module 56 with a unique ID and its own unique private key, to avoid cloning. Keys are generated and stored in the crypto chip inside the device, for maximum protection. All the communications between the devices are digitally signed with an asymmetric algorithm for authentication.

An anti-tamper sensor 58 detects if the anchor 14 is removed from its position on the container. The sensor 58 may be in the form of tamper detection switches on the case/housing (not shown) of the devices, and a protective circuit mesh (not shown) to avoid drilling into the case/housing.

The anchor 14 is powered by one or more batteries 60 (preferably a dual battery system), and is provided with a set of sensors 62 to monitor voltage and temperature to ensure the correct functioning and detect tamper attacks. The temperature sensor is used to detect extreme temperatures that may alter the functioning of the seal. Through the use of the temperature sensor, processor 50 is able to determine whether the current temperature is within a predetermined operational range, and/or generate an alert/exception (message) when the sensed temperature is outside that predetermined operational range.

The on-board voltage monitoring sensor (circuit) ensures the correct power supply to the device. The voltage monitoring sensor is used to detect exceptional voltages output by battery 60 that may alter the functioning of the seal. Through the use of the voltage monitoring sensor, processor 50 is able to determine whether the current voltage output is within a predetermined operational range, and/or generate an alert/exception (message) when the sensed voltage output is outside that predetermined operational range.

The device also has a strain sensor (e.g. a strain gauge or similar sensor) to check or monitor the tension of the fixing belt (not shown) used to fixedly attach the anchors 14, 16, 18 to the container body and/or to attach the tags 30, 32, 34 to the container lid 13. The strain sensor is used to detect exceptional levels of strain in the fixing belt (not shown) that may be indicative of an attempt to remove the belt of devices (i.e. tampering). Through the use of the strain gauge sensor, processor 50 is able to determine whether the current level of strain is within a predetermined operational range, and/or generate an alert/exception (message) when the sensed level of strain is outside that predetermined operational range.

The anchor 14 keeps a log of all detected events, and/or all sensor data, in an internal non-volatile memory (NVM) 64. Data stored in NVM 64 is preferably time-stamped using a precise timestamp from RTC 54.

Finally, the anchor 14 communicates with the master unit (26; FIG. 1) through a wired communication link 28 (such as a serial or parallel link) using communication module 66.

Figure 3:
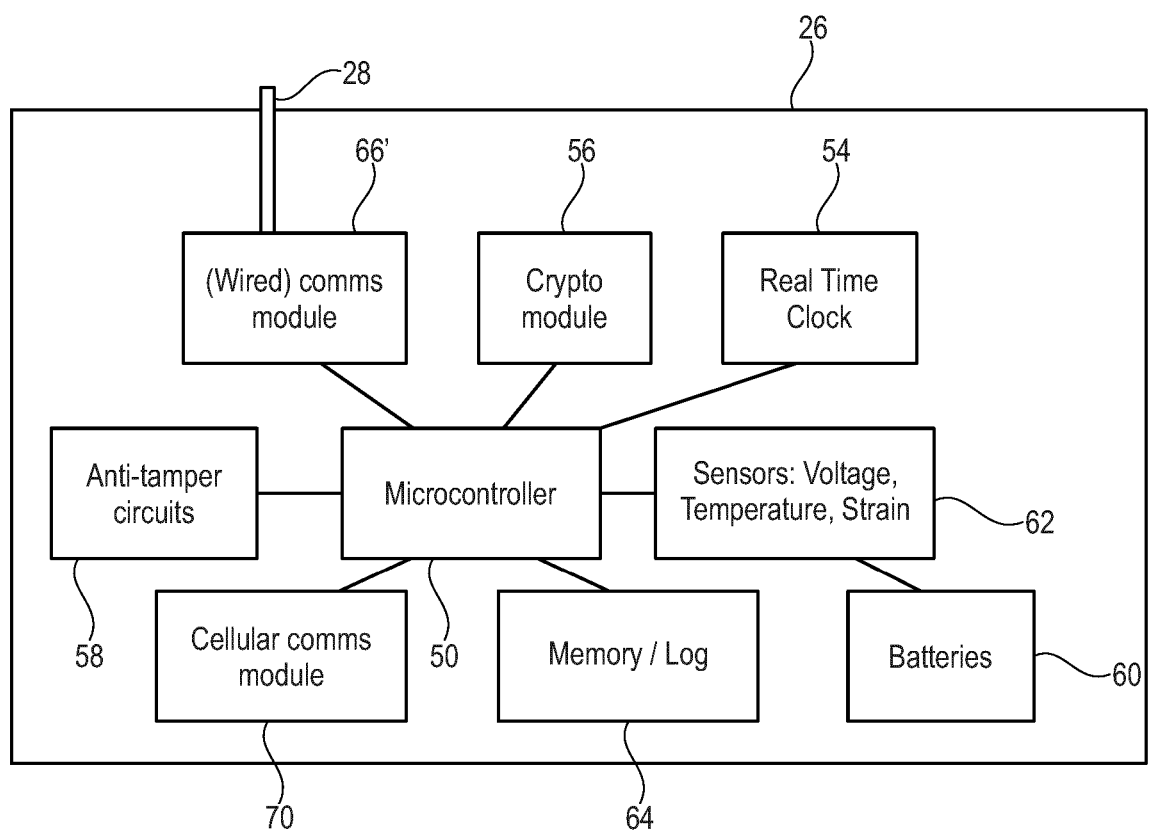
FIG. 3 is a schematic block diagram of a master unit used in embodiments of the invention.

FIG. 3 is a schematic block diagram of a master unit 26 used in embodiments of the invention. This is identical to the anchor 14 of FIG. 2, except as described in the following. The master unit 26 acts as a control unit for the sealing system.

In the master unit 26 of FIG. 3, a communication module 66', identical to the communication module 66 of anchor 14 and operating on the same protocol, e.g. serial or parallel, is included, for communication with the anchor 14 via wired communication link 28. In addition, the master unit 26 includes a long-range communications module 70, for communication to and from a remote central control station (not shown), e.g. belonging to a nuclear safety agency. The long-range communications module 70 may be a cellular communications module 70, e.g. GSM, 3G, 4G, 5G/LTE or the like.

In use, anchors 14, 16, 18 initiate the communication with the tags 30, 32, 34, i.e. each anchor 14, 16, 18 has a communication exchange with each of the tags 30, 32, 34. Once the container lid 13 with three tags is positioned close to a container body 12 with three anchors 14, 16, 18, the container body 12 and lid 13 are effectively paired, and any relative movement of the lid 13 with respect to the container body 12 will be detected, including lifting and or rotation.

Anchors 14, 16, 18 and tags 30, 32, 34 exchange data packages containing timing information. These packages are digitally signed, using cryptographic module 56 to avoid counterfeits. The master unit 26 collects all these data packages and calculates the time of flight of signals between anchors 14, 16, 18 and tags 30, 32, 34, and subsequently, through a triangulation algorithm, their relative (3D) positions. Sensors inside anchors 14, 16, 18 and tags 30, 32, 34 can detect if the device is removed from its position on the container 12. As discussed in more detail below, any attempt to lift the lid 13 is detected by the system and logged.

As discussed in more detail hereinafter, through the exchange of messages and consequent ranging/positioning, the devices (anchors 14, 16, 18 and tags 30, 32, 34) are "aware" of their respective position in 3D space and behave like a unique seal, i.e. unique to this container body 12 and lid 13 pairing. This "network" of 3D localized seal devices allows a precise detection of movement (of the devices, and therefore of lid 13, relative to container body 12), e.g. to an accuracy of about 5 to 15 cm.

In operation, each of the three anchors 14, 16, 18 interrogates the three tags 30, 32, 34. Each anchor 14, 16, 18 can determine at which distance the tags 30, 32, 34 are positioned, using time of flight information. The three anchors 14, 16, 18 are placed around the container body 12 in a plane parallel to the surface of the container lid 13, preferably at 120 degrees angular separation round the circumference of the container body 12. Anchors 14, 16, 18 and tags 30, 32, 34 exchange messages to determine the time of flight. These messages are digitally signed, to prevent any other fake tag from impersonating a legitimate one. All the anchors 14, 16, 18 provide the distance information to the master unit 26 over the wired communication channel 28. The master unit 26 collects all the authenticated information and, through a triangulation algorithm, determines the 3D position of each tag 30, 32, 34.

As the position of the three anchors 14, 16, 18 on the container body 12 is fixed and known, the position of the tags 30, 32, 34 can be determined by the master unit 26 therefrom. Three anchors 14, 16, 18 and three tags 30, 32, 34 is the minimum number to ensure a good 3D positioning. Four anchors 14, 16, 18 and four tags 30, 32, 34 may increase the precision of the 3D positioning, but at added cost/complexity.

Once the lid 13 is placed over the container body 12, the master unit logs the proximity of the three tags 30, 32, 34 connected to the lid 13. Any change to the position of each tag (or change greater than a threshold distance [threshold 1], e.g. lying in the range of 0.1 to 15 cm, preferably 0.1 to 5 cm, more preferably 0.1 to 1 cm) is considered as an opening of the lid. An algorithm processes the position/distance changes relative to the detection threshold(s) and may average the position/distance overtime to avoid false alarms.

Figure 4:
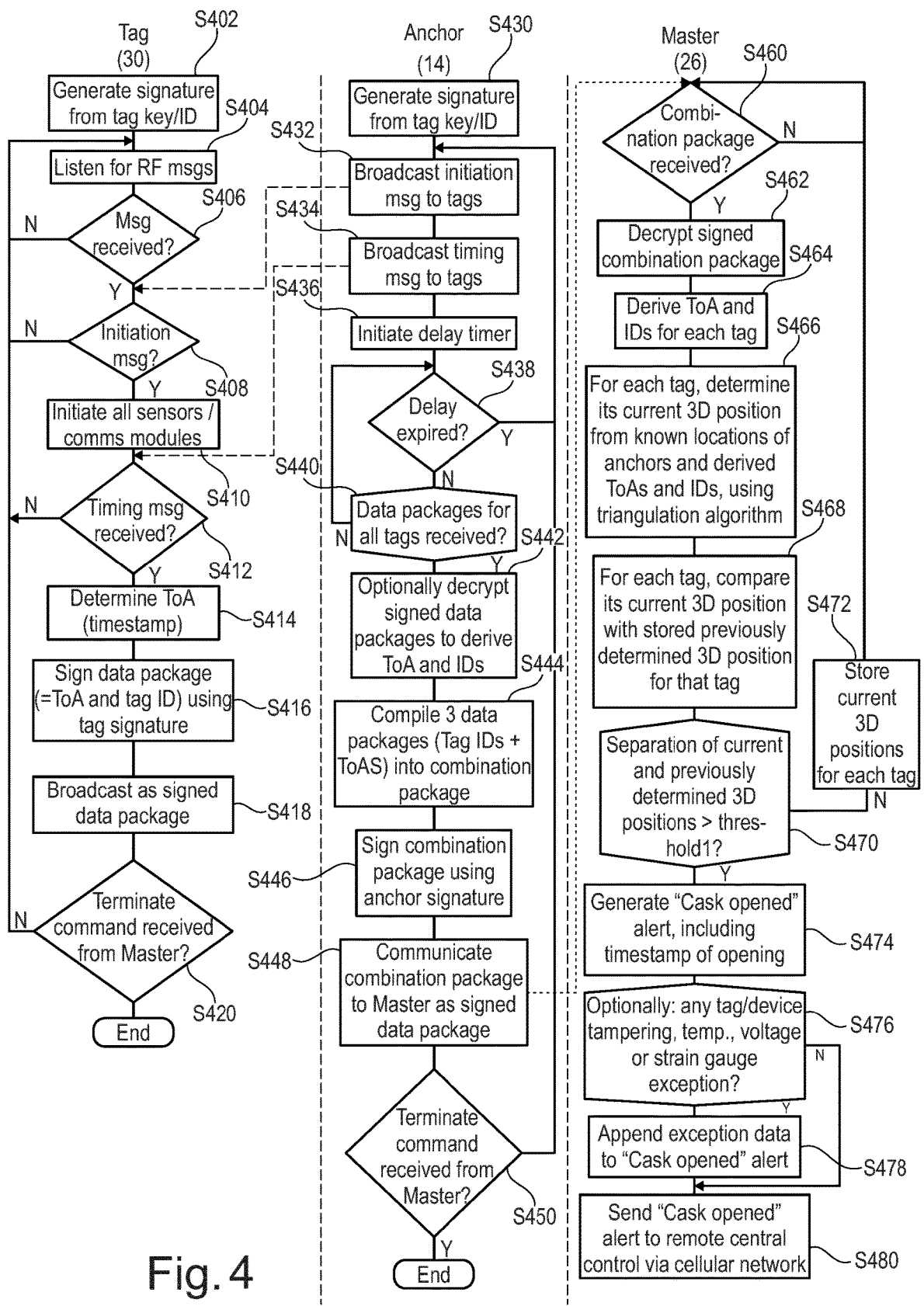
FIG. 4 is a flow chart of software/firmware processes carried out in the elements in FIG. 1 according to an embodiment of the invention.

FIG. 4 is a flow chart of software/firmware processes carried out in the elements in FIG. 1 according to an embodiment of the invention. That is, there are illustrated the steps or processes implemented at each tag 14, 16, 18, at each anchor 30, 32, 34, and at the master unit 26, in carrying out monitoring, detection of tampering with or opening of the cask (container) 10, and alerting. (For brevity, the process is described in relation to a single tag 30 and a single anchor 14; the process for the other tags and anchors is similar.)

Referring to the left hand column (tag) in FIG. 4, each tag 30, 32, 34 has its own unique identifier (ID), and using cryptographic module 56, tag 30 operates to generate a signature from the stored cryptographic key and tag ID (step s402). The tag 30 then listens for messages received via RF (step s404). At step s406, if no message is received, tag 30 continues to listen for messages received. If, at step s406, it is found that an RF message has been received, a check is made (step s408) as to whether it is recognisable as an initiation message from an anchor 14. At step s408, if no initiation message has been received, tag 30 continues to listen for messages received (s404).

Referring briefly to the central column in FIG. 4, each anchor 14, 16, 18 has its own unique identifier (ID), and using cryptographic module 56, anchor 14 operates to generate a signature from the stored cryptographic key and tag ID (step s430). Either periodically according to a preset periodicity using the real-time clock, or on command from the master unit 26, anchor 14 broadcasts (step s432) an initiation message to tags 30, 32, 34 in the vicinity, using UWB RF, the initiation message being designed to prepare tags 30, 32, 34 for 2-way communication and a 3D position determination operation.

As seen in the left hand column in FIG. 4, if, at step s408, it is found that initiation message has been received, tag 30 initiates (step s410) all sensors 58, 62 and communications modules 52, 66. The tag 30 then listens for a timing message via UWB RF. If, at step s412, it is found that no timing message has been received, tag 30 continues to listen for messages received (s404).

Following transmission of the initiation message by the anchor 14, and as seen in the central column in FIG. 4, e.g. a predetermined period thereafter, the anchor 14 broadcasts (s434) a timing message.

Returning to the left hand column in FIG. 4, if, at step s412, it is found that a timing message has been received from anchor 14, tag 30 determines (step s414) the time of arrival (ToA) of the timing signal using real-time clock 54 and timestamps the ToA based on the reading of the real-time clock 54. The ToA can subsequently be used to determine time of flight (ToF) from anchor 14 to tag 30.

Next, at step s416, a data package containing the ID of tag 30 and the ToA are digitally signed using the generated signature for the tag 30. The signed data package is then broadcast by the tag 30 at step s418.

A check is then made (step s420) in case a Terminate command has been received from the master unit 26 (e.g. via an anchor 14), indicating the RF transmissions or processing is to terminate; and if so, the process at tag 30 ends. If no Terminate command has been received, processing returns to step s404.

At the anchor 14 (see central column in FIG. 4), after transmission of the timing message by the anchor 14, a delay timer is initiated (step s436), the delay being designed to permit reception of responses from tags 30, 32, 34 to the timing signal.

A check is made (step s438) as to whether the delay has elapsed; and, if so, processing returns to step s432, where anchor 14 (re)broadcasts an initiation message to tags 30, 32, 34 in the vicinity.

If the delay has not elapsed, a determination is made (step s440) as to whether data packages (responses to the timing signal) for all tags 30, 32, 34 have been received by the anchor 14. If not, processing returns to step s438.

If it is determined (step s440) that data packages for all tags 30, 32, 34 have been received, the signed data packages are decrypted (s442) to derive ToA and ID for Tag 30. In this case (3 tags), the 3 data packages (Tag IDs+ToAs) are compiled into combination package at step s444.

Then, at step s446, the combination package is signed using the signature of anchor 14. Next, the combination package is sent (step s448) to the master unit 26 as a signed data package.

A check is then made (step s450) in case a Terminate command has been received from the master unit 26, indicating the RF transmissions or processing is to terminate; and if so, the process at anchor 14 ends. If no Terminate command has been received, processing returns to step s432.

Referring to the right hand column in FIG. 4, following the communication (step s448) of the combination package to master unit 26, as signed data package, and the determination (step s460) that the combination package has been received, the signed combination package is decrypted (step s462).

Next, based on the decrypted packages for each tag 30, 32, 34, the ToA and ID for each tag is derived (step s464); the ToF for each tag is derivable from the ToAs, as will be known to persons skilled in the art. For example, the timing message may comprise a precise timestamp indicating time of sending. The tag 30 applies a precise timestamp to the received timing message, indicating ToA. The tag 30 may calculate ToF=timestamp(arrival)−timestamp(sending), and include this in the data package broadcast to the anchor 14. More preferably, the tag 30 broadcast the ToA (timestamp), together with either the precise timestamp indicating time of sending, from the timing message, or an identifier of the timing message, from which the precise timestamp indicating time of sending can be obtained at the anchor 14 or master unit 26, thus enabling determination at the anchor 14 or master unit 26 of ToF (timing message)=timestamp (arrival)−timestamp(sending).

Then, for each tag, its current 3D position is determined (step s466) from known locations of anchors 14, 16, 18 and the derived ToAs and IDs, using triangulation algorithm.

Once the current 3D position is determined, then, for each tag, its current 3D position is compared (step s468) with the previously determined 3D position for that tag (stored in NVM 64; FIG. 2). A check is then made (step s470) as to whether the magnitude of the separation of current and previously determined 3D positions is greater than a first threshold (threshold 1).

If the magnitude of the separation is not greater than the first threshold, the determined current 3D position for each tag is stored (step s472) in NVM 64.

If, on the other hand, the magnitude of the separation is greater than the first threshold, indicating that substantial movement of the lid 13 relative to the container 12 (FIG. 1) corresponding to an act of tampering or (attempted) opening has occurred, the master unit generates (step s474) a "Cask opened" alert (message), including timestamp of opening; the alert is logged in NVM 64.

As seen at step s476, optionally a check is made for any tag/device tampering, temperature, voltage or strain sensor exception data, i.e. from sensors 58, 62, respectively, and optionally this data is appended (step s478) to "Cask opened" alert (message).

The three anchors 14 are fixed on the container body 12 using a rigid tension belt (not shown) under tension. Each anchor 14, 16, 18 can monitor the tension of the belt. In case of an attempt to remove the system from the cask 10, the tension from the belt is released, and the master unit 26 detects the tampering, generating the strain gauge exception data. A similar detection system is in place on the belt (not shown) that fixes the three tags 30, 32, 34 to the lid 13. Similar appending action is performed in the event of tag/device tampering, temperature, or voltage level exception data.

Then, at step s480, the "Cask opened" alert (message) is sent to remote central control (not shown) via a cellular network, e.g. GSM, 3G, 4G etc., using communications module 70 (FIG. 3) of master unit 26.

The master unit 26 is configured to be interrogated by an inspector with a suitable reader (not shown), e.g. via wired (serial/parallel) device port, or by short-range wireless communication, such as Bluetooth®. Alternatively or additionally, master unit 26 is provided with a remote communication module 70 that uses existing telecom infrastructure (i.e. GSM, GPRS, 3G or other system), allowing a remote interrogation of master unit 26, e.g. to obtain status data, logs and/or tampering reports/alerts. Such data may be securely communicated to a remote location/station in digitally signed form using the unique cryptographic key and the cryptographic module 56 of master unit 26.

The duty of the inspector (e.g. from a nuclear inspection agency) is to check that the initial installation of the fixing belt (not shown) of anchors 14, 16, 18 and tags 30, 32, 34 is correct. This meets the requirement that sealing system 10 shall be installed by a trusted person (an inspector) on the container some time before the container is loaded. This is a simple operation and can be done on a batch of containers at the most convenient time in a non-restricted area where exposure to radiation is minimal or absent. This is the only operation that requires the presence of an inspector. That is, all other operations may be unattended (by the inspector).

The sealing system 10, once in place, is autonomous. Once a lid 13 is placed close to a container body 12, the sealing system 10 detects the lid 13 and pairs it to the container body 12. Everything is automatic and wireless, and no wiring or any mechanical operation is needed. This means that the container is loaded and closed by the nuclear power plant operator without the presence of an inspector.

Moreover, the sealing system 10 can be remotely interrogated to check its status and access the internal log. Once the container is opened and emptied, the sealing system 10 can be removed from the container and sent back to the inspectors to be reused.

While embodiments have been described by reference to embodiments having various components in their respective implementations, it will be appreciated that other embodiments make use of other combinations and permutations of these and other components.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the scope of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

| Legend: | | | |
|---|---|---|---|
| 10 | sealing system | 34 | tag |
| 12 | container body | 50 | processor |
| 13 | container lid | 52 | UWB RF module |
| 14 | anchor | 54 | real-time clock |
| 16 | anchor | 56 | cryptographic module |
| 18 | anchor | 58 | anti-tamper sensor |
| 20 | open end | 60 | battery |
| 22 | bus | 62 | voltage, temperature and strain sensors |
| 26 | master unit | | |
| 28 | wire link | 64 | NVM |
| 30 | tag | 66 | wired communications module |
| 32 | tag | 70 | cellular communications module |

The invention claimed is:

1. A sealing system configured to seal a container lid of a nuclear container to a container body of said nuclear container, said sealing system comprising:
at least three tags adapted to be mounted to one of said container lid or said container body, each tag having a unique ID and comprising a first RF transceiver configured to transmit, in use, a respective first RF signal;
at least three anchors adapted to be mounted to the other one of said container lid or said container body, each anchor having a unique ID and comprising a second RF transceiver configured to receive, in use, the respective first RF signal; and
a master unit, coupled for communication with the at least three anchors,
wherein the master unit is adapted to:
(i) determine, associated with the unique ID for each tag, a respective current 3D position, based on the respective first RF signal,
(ii) store previously determined 3D positions for each tag, and
(iii) generate an alert and/or a timestamp and/or a log entry if it determines that separation between the current 3D position of one or more of the at least three tags and a respective previously determined 3D position is greater than a predetermined distance threshold.

2. The sealing system according to claim 1, wherein said master unit has one of said at least three anchors integrated therein.

3. The sealing system according to claim 1, wherein each of the anchors is configured for transmitting, periodically or on command from the master unit, a second RF signal, the second RF signal comprising a timing signal.

4. The sealing system according to claim 3, wherein each first RF signal comprises a signal generated at a respective tag of the at least three tags in response to the second RF signal and/or including an indication of the time of arrival at the respective tag of the second RF signal.

5. The sealing system according to claim 1, wherein the master unit is configured for performing temporal averaging of the first RF signal and/or data indicative of the respective current 3D position.

6. The sealing system according to claim 1, wherein the master unit is configured for determining a time point at which the separation between the anchors and the tags has minimized or stabilized.

7. The sealing system according to claim 1, wherein the anchors are fixedly attached on the container body or the container lid at known locations, and the master unit is configured to determine, for each tag, a respective current 3D position based on the known locations.

8. The sealing system according to claim 1, wherein the master unit is configured to determine, for each tag, a respective current 3D position using a triangulation algorithm.

9. The sealing system according to claim 3, wherein each tag and/or each anchor includes a real-time clock, and the first RF signal and/or the second RF signal incorporates a timestamp derived from a respective real-time clock.

10. The sealing system according to claim 1, wherein each of said at least three anchors is configured to transmit a combined signal to the master unit via a bus, the combined signal comprising a package for each of said at least three tags, each package including the tag ID and time of arrival data.

11. The sealing system according to claim 1, wherein each tag and/or each anchor and/or the master unit comprises a non-volatile memory for storing said 3D positions, in association with respective tag IDs.

12. The sealing system according to claim 10 wherein:
(i) each tag includes a first cryptographic module configured for generating and storing a first cryptographic key and/or first digital signature, and each tag of said at least three tags is configured for signing said first RF signal using said first cryptographic key or first digital signature prior to transmission to an anchor of said at least three anchors; and/or
(ii) each anchor of said at least three anchors includes a second cryptographic module configured for generating and storing a second cryptographic key and/or second digital signature, and each anchor of said at least three anchors is configured for:
a. signing said second RF signal using said second cryptographic key or second digital signature prior to transmission to a tag of said at least three tags; and/or
b. signing said combined signal using said second cryptographic key or second digital signature prior to transmission to the master unit.

13. The sealing system according to claim 1, wherein:
(i) each tag (30, 32, 34) and/or each anchor (14, 16, 18) includes a tamper detection sensor configured for generating, in the event of detection thereby of tampering with a housing of a tag or an anchor, tamper detection data indicative of said tampering with the housing; and/or
(ii) each tag and/or each anchor includes one or more batteries, coupled thereto, a voltage detection sensor configured for generating, in the event of detection thereby of exceptional voltage levels outside a first predetermined range, voltage exception data indicative of tampering with the battery or batteries; and/or
(iii) each tag and/or each anchor includes a temperature sensor configured for generating, in the event of detection thereby of exceptional temperature levels outside a second predetermined range, temperature exception data indicative of tampering with a tag or an anchor; and/or
(iv) each tag and/or each anchor is attached to the container lid or the container body, by a rigid tension belt, for example a steel belt, each tag and/or each anchor includes a strain sensor adapted for sensing strain in the belt, the strain sensor being configured for generating, in the event of detection thereby of exceptional strain levels outside a third predetermined range, strain exception data indicative of tampering with a tag or an anchor.

14. The sealing system according to claim 1, wherein the master unit includes a long-range communications module and is configured
(i) in response to the generation of the alert, to
a. generate a cask opened alert, append thereto any data indicative of tampering with the housing, data indicative of tampering with a battery or batteries, temperature exception data and/or strain exception data, and
b. transmit the cask opened alert to a remote control location using the long-range communications module, and/or
(ii) in response to a status request received from a remote control location using the long-range communications module, to transmit a sealing system status report, the sealing system status report including the timestamp and details of any cask opened alert, and any data indicative of tampering with the housing, data indicative of tampering with the battery or batteries, temperature exception data and/or strain exception data; wherein the sealing system status report is transmitted to the remote control location using the long-range communications module.

15. A method of installing a sealing system, comprising: providing the sealing system according to claim 1; mounting the at least three tags to the container lid; mounting the at least three anchors, or two anchors of the at least three anchors and the master unit, to the container body; and initiating the sealing system.

* * * * *